H. L. DOOLEY.
VARIABLE DROP SEED PLANTER.
APPLICATION FILED APR. 2, 1910. RENEWED AUG. 21, 1915.
1,176,820.
Patented Mar. 28, 1916.
3 SHEETS—SHEET 3.
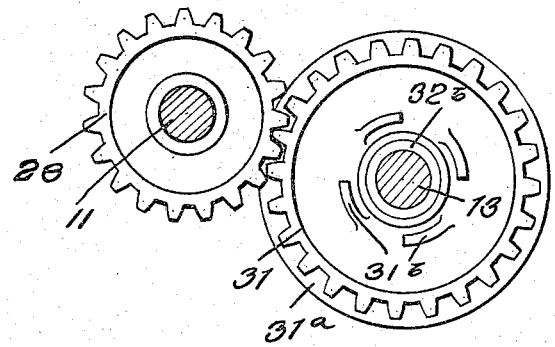
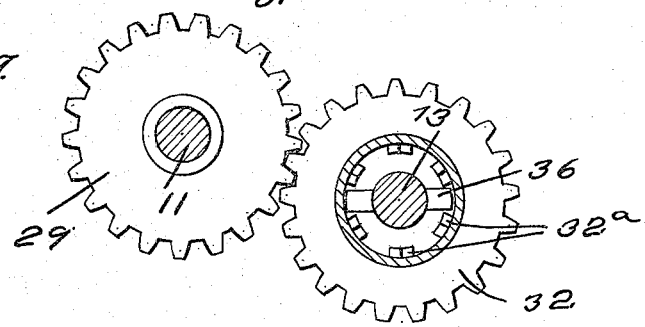
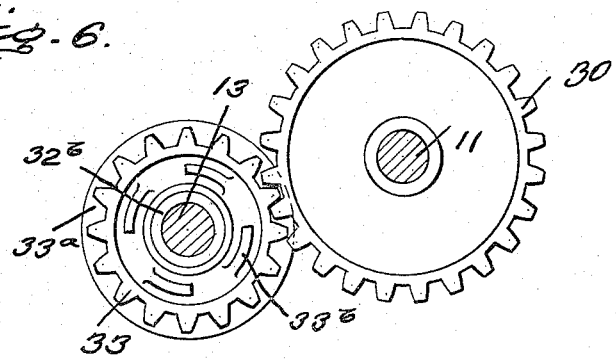
Witnesses
B. G. Brown
S. Jay Teller
Inventor
Harry L. Dooley
By H. H. Bliss
Attorney

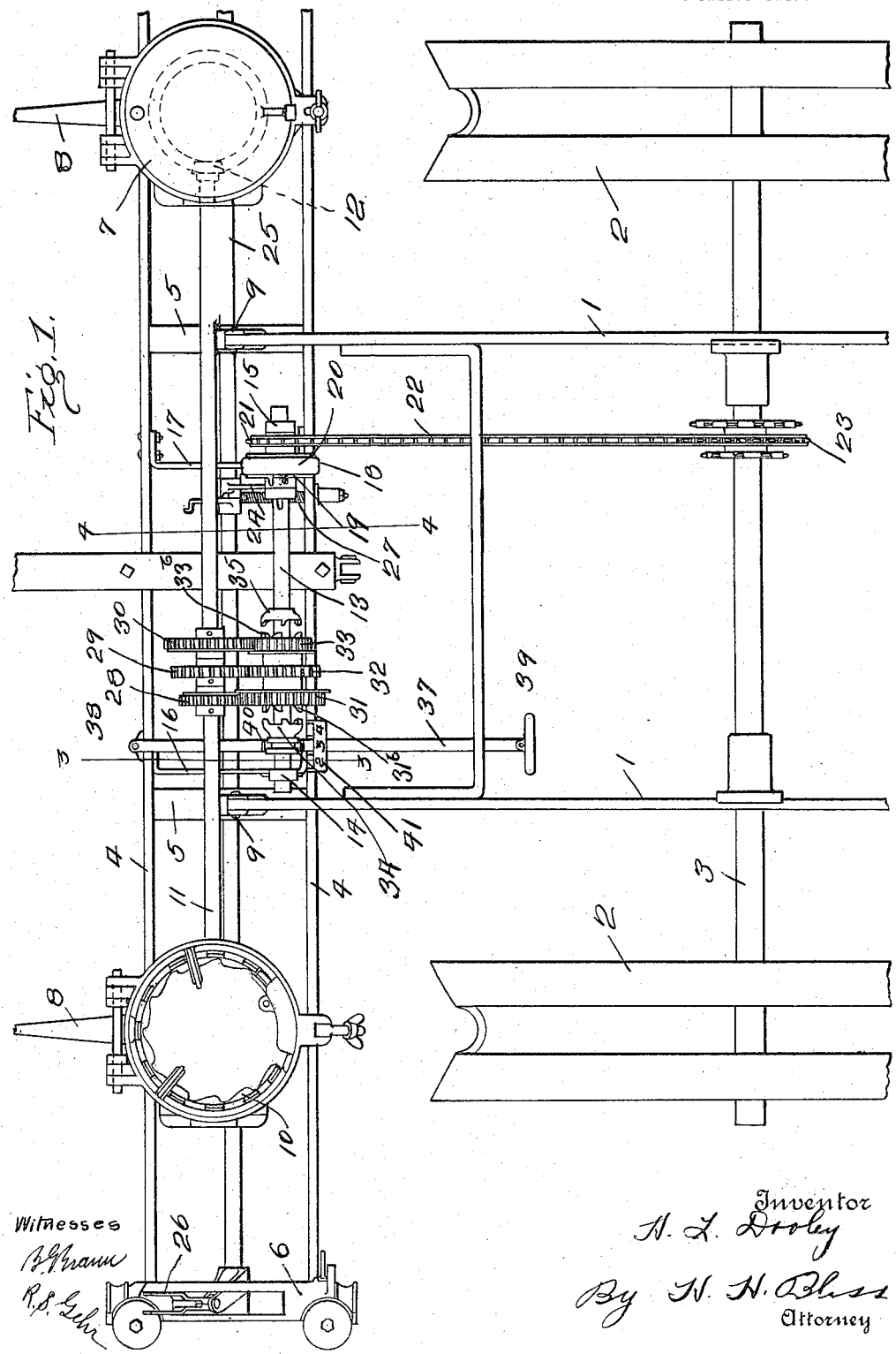

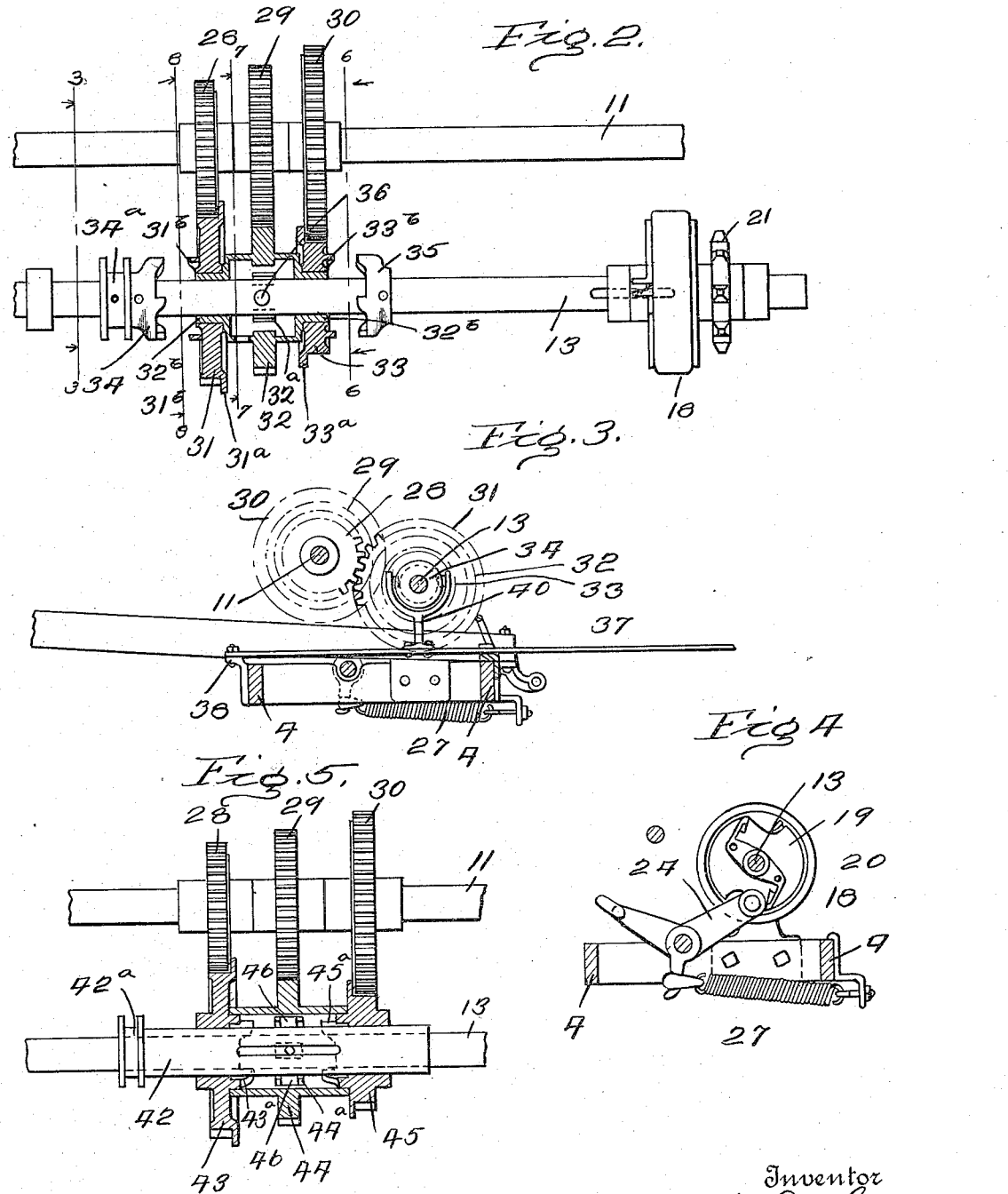

UNITED STATES PATENT OFFICE.

HARRY L. DOOLEY, OF ROCK ISLAND, ILLINOIS.

VARIABLE-DROP SEED-PLANTER.

1,176,820.  Specification of Letters Patent.  Patented Mar. 28, 1916.

Application filed April 2, 1910, Serial No. 553,065. Renewed August 21, 1915. Serial No. 46,670.

*To all whom it may concern:*

Be it known that I, HARRY L. DOOLEY, citizen of the United States, residing at Rock Island, in the county of Rock Island and State of Illinois, have invented certain new and useful Improvements in Variable-Drop Seed-Planters, of which the following is a specification, reference being had therein to the accompanying drawing.

This invention relates to seed planters which are designed to separate the individual seeds from a mass and deliver them, one at a time, to dropping mechanism, said dropping mechanism being actuated intermittently to deposit a plurality of the seeds in the soil. In planters of this kind it is often desirable to vary the number of seeds delivered to the dropping mechanism between the intermittent operations of said mechanism so as to vary the number of seeds dropped in a hill.

The object of my present invention is to provide efficient and dependable means conveniently operable by the driver for so varying the number of seeds dropped.

Separating and dropping mechanisms of the character referred to are more commonly employed in connection with planters of the check row type and in the accompanying drawing I have shown my invention embodied in a planter of this kind.

Figure 1 is a plan view of a planter embodying my invention, only so much of the machine being shown as is necessary for a clear understanding of the invention. Fig. 2 is a plan view of a variable gearing by means of which the seeder shaft is driven, some of the gears being shown in section. Fig. 3 is a vertical section on the line 3—3 of Fig. 1. Fig. 4 is a vertical section on the line 4—4 of Fig. 1, and Fig. 5 is a view similar to that in Fig. 2, showing a modified form of gearing. Fig. 6 is a fragmentary cross sectional view taken along the line 6—6 of Fig. 2. Fig. 7 is a fragmentary cross sectional view taken along the line 7—7 of Fig. 2. Fig. 8 is a fragmentary cross sectional view taken along the line 8—8 of Fig. 2.

Referring in detail to the construction shown, 1, 1, are the side bars of the main frame of the machine, 2, 2 the ground wheels, and 3 the axle upon which the main frame is supported.

4, 4, are the main bars of the transverse front frame which carries the planter mechanism proper. The bars 4 are connected by cross bars or braces 5, 5, and by the check heads 6 and by the frames of the seed hoppers 7 and the runners or shoes 8, in the usual and well known manner. The front frame is pivotally connected to the main frame by bolts 9, 9, which pass through the front ends of the frame bars 1, 1, and upstanding brackets on the cross bars or braces 5, 5.

A two row planter is shown, the hoppers and seed separating mechanisms being shown in duplicate, but it will suffice to describe one of the seed plate mechanisms as they are substantially similar. At the bottom of each of the hoppers 7, is a rotary seed plate 10, and this plate is driven from the seeder shaft 11, by interposed bevel gearing 12. On the central part of the transverse frame is mounted a clutch shaft 13, said shaft being supported in bearing brackets 14 and 15, which in turn are carried by transverse bars 16 and 17, respectively, of the front frame. On the shaft 13 is mounted a clutch 18, which comprises a disk part 19, loosely keyed on the shaft 13, so as to permit said shaft to slide through it, and a drum part 20 which is mounted adjacent the disk part so as to turn freely on the shaft 13. The drum 20 carries a sprocket wheel 21, and is continuously driven from the axle 3, by a sprocket chain 22, which passes over the sprocket wheel 21 and a sprocket wheel 23 on the axle. This clutch 18 which I show embodies improved features which constitute in part the subject matter of my application Serial Number 551,233, filed March 24, 1910. The clutch however is not shown in detail here as the clutch itself constitutes no part of the present invention and clutches which operate in the same general manner are well known. It will suffice to say that the clutch comprises suitable pawl and ratchet mechanism by means of which the disk part 19 can be connected to the drum part 20 and be driven thereby. Normally the pawl devices of the clutch are held in inoperative position by an arm 24, on the rocker shaft 25. At its outer ends the shaft 25, carries the check forks 26, which are constructed and which operate in the usual manner. The check forks 26, the shaft 25 and the clutch arm 24 are held in their normal position by the spring 27, but when the check fork is engaged by a tappet on the wire, the fork is swung backward and with it is carried the shaft 25 and the arm 24. This movement of the arm 24 releases the pawl mechanism of the clutch allowing it to operatively connect the disk 19 to the rotating drum 20, so that said disk, and with it the clutch shaft 13, are made to turn with the drum 20. This movement of the shaft 13 continues for a half revolution, whereupon the clutch arm 24, having been returned to its normal position by the spring 27, the pawl mechanism of the clutch is engaged by said arm and moved to an inoperative position so that movement of the disk 19 and shaft 13 is stopped. This intermittent actuation of a rotating part, by means of a clutch mechanism controlled by the check forks, is well known and commonly employed in the art. But ordinarily the clutch mechanism is mounted directly upon the seeder shaft. In my improved machine however, the clutch is mounted upon a counter shaft 13 in the manner described, and the seeder shaft 11 is driven from the counter shaft by means of a gearing which is adapted to vary the amount of movement given the seeder shaft by the intermittent movement of fixed amount which is given the counter shaft 13 by the clutch mechanism. This gearing comprises three spur gears 28, 29, and 30, of different sizes which are rigidly fixed on the seeder shaft 11, and three spur gears 31, 32 and 33, which are mounted on the counter shaft 13 in mesh with the gears 28, 29 and 30 respectively.

In their preferred form, and as shown in Fig. 2, the three gears on shaft 13 are constructed as follows: The hub of the middle gear 32 is in the form of a hollow cylinder having inwardly extending flanges or teeth 32$^a$, and laterally extending sleeves 32$^b$ which fit rotatably upon the shaft 13, and upon which are rotatably mounted the gears 31 and 33. The gears 31 and 33 have shrouds 31$^a$ and 33$^a$ which prevent axial movement of the three gears on the shaft 13. It will be seen that each of the three gears 31, 32 and 33 is so mounted that it can turn freely relative to the shaft 13, and means is provided for connecting any one of said three gears to the shaft 13 so that rotation of the latter can be transmitted to the seeder shaft 11. This connecting means comprises a clutch collar 34 fast on the shaft 13 and adapted to coöperate with clutch teeth 31$^b$ on gear 31, a similar clutch collar 35 fast on shaft 13 and adapted to coöperate with clutch teeth 33$^b$ on gear 33, and one or more radially extending pins 36 carried by the shaft 13 within the hollow hub of gear 32 and adapted to engage the internal teeth 32$^a$ thereof. The three clutch elements 34, 35 and 36 are so spaced in relation to each other and to the three gears on shaft 13, that by endwise movement of said shaft, any one of said clutch elements can be brought into engagement with its coöperating clutch teeth on one of the gears. Thus in Fig. 2, the shaft is in its normal intermediate position, with the clutch element 36 in position to engage and turn the gear 32. By moving the shaft 13 to the right, gear 32 is disconnected and gear 31 is connected to the shaft 13 and as the latter gear is of greater diameter than the gear 32, the fixed rotation of the shaft 13 results in a greater movement of the seeder shaft 11, than is given to it when the movement is transmitted through the gear 32. Similarly by moving the shaft 13 to the left, gear 33 is connected to said shaft and transmits its movement to the seeder shaft but in reduced amount. I prefer to so proportion the intermeshing gears that when the intermittent rotation of uniform extent of the clutch shaft is transmitted through the gears 29, 32, the seeder shaft will be turned just far enough to cause three of the individual seed cells of the seed plate 10 to pass over the discharge opening leading to the dropping mechanism, whereas when the movement of the clutch shaft is transmitted through the gears 30, 33, the amount of the rotation of the seeder shaft 11 will be such as to cause four seed cells to pass over the discharge opening, and when the movement of the shaft 13 is transmitted through gears 28, 31, the seeder shaft will be moved only far enough to carry two seed cells over the discharge opening. Thus either two, three or four seeds can be delivered to the dropping mechanism and, when said mechanism is actuated by the check fork, deposited in the soil. To readily effect the change from three to two or four seeds in the hill, I provide a foot lever which is pivoted at 38 on the front frame and provided at its rear end with a stirrup 39. This lever carries a forked bracket 40, the arms of which engage a groove 34$^a$ of the clutch collar 34. By swinging this foot lever to right or left the shaft 13 is moved endwise to operatively connect any one of the three gears 31, 32 and 33. The foot lever passes through a notched bracket 41, said bracket having three notches corresponding to the three positions of the shaft and which serve to secure the parts in adjusted position. The bracket also displays the numerals two, three and four above the several notches, said numerals indicating the number of seeds dropped when the foot lever is in a notch beneath one of the numerals.

In Fig. 5 I have shown a modified form of gearing. Here a sleeve 42 is slidably keyed upon the clutch shaft 13 and upon this sleeve 42 are mounted the two outside gears 43 and 45 while the intermediate gear 44 is rotatably mounted upon the gears 43, 45. The gear 44 is provided with radially extending-internal clutch teeth 44$^a$, and the gears 43 and 45 have on their inner sides and within the hollow cylindrical hub of gear 44, laterally extending clutch teeth 43ª and 45ª respectively. The sleeve 42 carries clutch pins or lugs 46 which are adapted to engage either the clutch teeth 44ª, 43ª or 45ª, such engagement being effected at will by shifting the sleeve 42 endwise. This sleeve is provided with a grooved collar 42ª and can be actuated in the same manner and by the same means as is shown in Fig. 1, for actuating the shaft 13.

It will be noted that I have shown in the drawings a seeder plate having twelve cells. Any desired number of cells can be used, however, but it is essential that the gearing ratios and the numbers of clutch teeth for engaging the different gears be properly determined. For purposes of illustration I have shown the gearing beneath the seeder plate as having a ratio of 1:2.

The following are the numbers of teeth on the gears shown in Figs. 6, 7 and 8:

|  | Number of clutch gear teeth. | Number of seeder shaft gear teeth. | Ratio. |
| --- | --- | --- | --- |
| Two kernel drop | 16 | 24 | 2:3 |
| Three kernel drop | 21 | 21 | 3:3 |
| Four kernel drop | 24 | 18 | 4:3 |

The actual number of teeth is, of course, theoretically immaterial, and it is only necessary to determine numbers which are adapted for practical use. It will be noted, however, that the gear ratios must vary in proportion to the numbers of kernels dropped. It will also be noticed that I have shown in the drawings for purposes of illustration six clutch teeth on the central clutch shaft gear and four clutch teeth on each of the other clutch shaft gears. The numbers of these clutch teeth is also important as it is obviously desirable that the position of the seeder plate at the end of each actuation be the same regardless of which clutch tooth may have been engaged by the engaging element of the clutch shaft. The actual numbers may be varied, but I have found that this result is obtained when the number of clutch teeth is either a factor or multiple of the number of seed plate cells to be moved past the cut-off, that is, of the number of kernels to be dropped.

In a co-pending application, entitled Planters, filed March 24, 1910, Serial No. 551,232, I have shown a planter having a series of bevel gearing at the ends of the seeder shaft and immediately beneath the seed planter. I do not, therefore, herein claim broadly the use of a plurality of continually meshing trains of gearing for driving the seed plates, or other features disclosed in the said application.

What I claim is:

In a corn planter, the combination of a frame, two oppositely disposed seeder mechanisms, each having a rotary plate with uniformly spaced single kernel cells and adapted to travel at each of its movements over either of several distances which are differing multiples of the distance from one cell to the next, a kernel receptacle below each plate registering with the last cell of the series of cells predetermined to reach it at each movement of the plate, a shaft 11 driving the seed plates in common, a shaft 13 parallel to the shaft 11, two differently speeded pairs of gear mates situated between the two seeding mechanisms and fixed against bodily movement, one gear of each pair being a driver on shaft 13 and the other being a driven gear on shaft 11, which when power actuated moves said shaft and both seed plates through one of the said predetermined multiple distances the mates of each pair being constantly in mesh, a continuously acting prime driver receiving power from the ground wheels, a tappet actuated clutch having a normally locked driven member for transmitting parts of said power through predetermined successive cycles to the said shaft 13, manually controllable means for moving the said shaft 13 longitudinally with respect to the said clutch and the said gears, and means dependent upon the longitudinal movement of the shaft for connecting it to one or the other of the said driver gears.

In testimony whereof I affix my signature, in presence of two witnesses.

HARRY L. DOOLEY.

Witnesses:
 OSCAR F. LUNDAHL,
 ROBERT M. ADAMS.